United States Patent
Kakita et al.

(10) Patent No.: US 11,789,903 B1
(45) Date of Patent: Oct. 17, 2023

(54) TAGGING TOOL FOR MANAGING DATA

(71) Applicant: Wells Fargo Bank, N.A., San Francisco, CA (US)

(72) Inventors: Neil Kakita, Las Vegas, NV (US); Abhijit Rao, Irvine, CA (US); Robert Louis Sellers, San Mateo, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 7 days.

(21) Appl. No.: 17/112,671

(22) Filed: Dec. 4, 2020

Related U.S. Application Data

(63) Continuation of application No. 15/626,875, filed on Jun. 19, 2017, now Pat. No. 10,884,981.

(51) Int. Cl.
*G06F 16/00* (2019.01)
*G06F 16/14* (2019.01)

(52) U.S. Cl.
CPC .......... *G06F 16/148* (2019.01); *G06F 16/144* (2019.01)

(58) Field of Classification Search
CPC .............................. G06F 16/148; G06F 16/144
See application file for complete search history.

(56) References Cited

U.S. PATENT DOCUMENTS

| | | | |
|---|---|---|---|
| 7,146,030 B2 | 12/2006 | Vailaya et al. | |
| 7,464,086 B2 | 12/2008 | Black et al. | |
| 7,657,064 B1 | 2/2010 | Conwell | |
| 8,145,677 B2 | 3/2012 | Al-Shameri | |
| 8,176,004 B2 | 5/2012 | Malaney et al. | |
| 8,724,907 B1* | 5/2014 | Sampson | G06V 30/1914 382/209 |
| 8,995,774 B1 | 3/2015 | van Deventer et al. | |
| 8,996,350 B1 | 3/2015 | Dub et al. | |
| 9,262,296 B1 | 2/2016 | Soeder et al. | |
| 2002/0107847 A1 | 8/2002 | Johnson | |
| 2006/0008122 A1 | 1/2006 | Kurzweil et al. | |
| 2006/0251338 A1* | 11/2006 | Gokturk | G06K 9/6218 707/E17.022 |
| 2008/0159622 A1 | 7/2008 | Agnihotri et al. | |
| 2009/0116736 A1 | 5/2009 | Neogi et al. | |
| 2011/0307542 A1* | 12/2011 | Wang | G06F 16/5866 707/812 |
| 2014/0181089 A1* | 6/2014 | Desmond | G06F 16/51 707/722 |

(Continued)

OTHER PUBLICATIONS

Wallace et al., "Machine Learning to Improve a Document Pipeline," Proceedings of the Twenty-Seventy International Florida Artificial Intelligence Research Society Conference, Nov. 21, 2014, 6 pp.

(Continued)

*Primary Examiner* — Paul Kim
(74) *Attorney, Agent, or Firm* — Shumaker & Sieffert, P.A.

(57) ABSTRACT

A plurality of files that include unsearchable computer data may be analyzed and tagged. A plurality of tags that relate to characteristics of the files is determined. The characteristics relate to both the data included in the files as well as the general structure or nature of the files. The plurality of computer files is then tagged or associated with these tags, enabling the plurality of computer files to be searched to identify and retrieve relevant files of the computer files. The tags may be updated in response to various prompts to reflect changing computer files.

16 Claims, 5 Drawing Sheets

(56) References Cited

U.S. PATENT DOCUMENTS

2015/0106258 A1    4/2015  Coomes et al.
2016/0110471 A1    4/2016  Bagheri et al.
2019/0392055 A1* 12/2019 Rose ................... G06F 16/5838

OTHER PUBLICATIONS

Prosecution History from U.S. Appl. No. 15/626,875, dated Dec. 19, 2019, through Sep. 10, 2020, 64 pp.

* cited by examiner

TAGGING TOOL FOR MANAGING DATA

RELATED APPLICATIONS

This application is a continuation of U.S. application Ser. No. 15/626,875, filed Jun. 19, 2017, the contents of which is hereby incorporated by reference in its entirety.

TECHNICAL FIELD

The invention relates to a computerized analysis of data stored in an unsearchable format.

BACKGROUND

Computers may store files of data in various formats. Depending upon the format of a stored file, the computer may be able to read and/or access specific portions of data of the stored file. Storing data in different file formats may alter the variety of data that a computer can read and/or access from the file. For example, if a file is stored in a .doc format from a Microsoft Word program, a .pages format from an Apple Pages program, or a .txt format from, e.g., Notepad, a computer may be able to read and/or access text characters of the file. Alternatively, if a file is stored in an .xls format from a Microsoft Excel program, a .numbers format from an Apple Numbers program, or a .csv format from, e.g., Google Spreadsheets, a computer may be able to read and/or access a plurality of datum points that are partitioned into different segments.

SUMMARY

In general, this disclosure describes techniques for computerized analysis of a plurality of files that include unsearchable computer data. The computerized analysis determines a plurality of tags that relate to characteristics of the files. The characteristics may relate to both the data included in the files as well as the general structure or nature of the files (i.e., the relationship between the data included in each of the files). For example, tags may relate to a user "David Williams," or tags may relate to a document format "I9." The plurality of computer files is then tagged or associated with these tags, enabling the plurality of computer files to be searched (e.g., searched for these tags) to identify relevant ones of the computer files. The tags may be updated in response to various prompts to reflect changing computer files. By tagging unsearchable computer files and updating tags to reflect changing computer files, the techniques discuss herein may result in performance benefits in enabling computers to organize, analyze, and retrieve relevant computer files that were otherwise unsearchable.

In one example, this disclosure is directed to a computing device comprising at least one processor and a memory coupled to the processor, the memory storing instructions that, when executed, cause the at least one processor to determine, for a plurality of computer files that include data stored in one or more unsearchable formats, a plurality of tags, wherein the plurality of tags includes one or more datum tags that each indicates a datum included in at least one computer file of the plurality of computer files and one or more relationship tags that each indicates a relationship between data included in the at least one computer file of the plurality of computer files. The memory further storing instructions that, when executed, cause the at least one processor to tag each computer file of the plurality of computer files based on the determined plurality of tags such that each computer file is associated with at least one of the datum tags and at least one of the relationship tags of the plurality of tags. The memory further storing instructions that, when executed, cause the at least one processor to search the plurality of computer files for one or more tags of the plurality of tags. The memory further storing instructions that, when executed, cause the at least one processor to retrieve, in response to the searching, a subset of the plurality of computer files that contain the one or more tags.

In another example, this disclosure is directed to a computer-implemented method that includes determining, for a plurality of computer files that include data stored in one or more unsearchable formats, a plurality of tags, wherein the plurality of tags includes one or more datum tags that each indicates a datum included in at least one computer file of the plurality of computer files and one or more relationship tags that each indicates a relationship between data included in the at least one computer file of the plurality of computer files. The computer-implemented method further includes tagging each computer file of the plurality of computer files based on the determined plurality of tags such that each computer file is associated with at least one of the datum tags and at least one of the relationship tags of the plurality of tags. The computer-implemented method further includes searching the plurality of computer files for one or more tags of the plurality of tags. The computer-implemented method further includes retrieving, in response to the searching, a subset of the plurality of computer files that contain the one or more tags.

In a further example, this disclosure is directed to a non-transitory computer-readable storage medium having stored thereon instructions that, when executed, cause a processor to determine, for a plurality of computer files that include data stored in one or more unsearchable formats, a plurality of tags, wherein the plurality of tags includes one or more datum tags that each indicates a datum included in at least one computer file of the plurality of computer files and one or more relationship tags that each indicates a relationship between data included in the at least one computer file of the plurality of computer files. The instructions of the non-transitory computer-readable storage medium, when executed, further cause the processor to tag each computer file of the plurality of computer files based on the determined plurality of tags such that each computer file is associated with at least one of the datum tags and at least one of the relationship tags of the plurality of tags. The instructions of the non-transitory computer-readable storage medium, when executed, further cause the processor to search the plurality of computer files for one or more tags of the plurality of tags. The instructions of the non-transitory computer-readable storage medium, when executed, further cause the processor to retrieve, in response to the searching, a subset of the plurality of computer files that contain the one or more tags.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
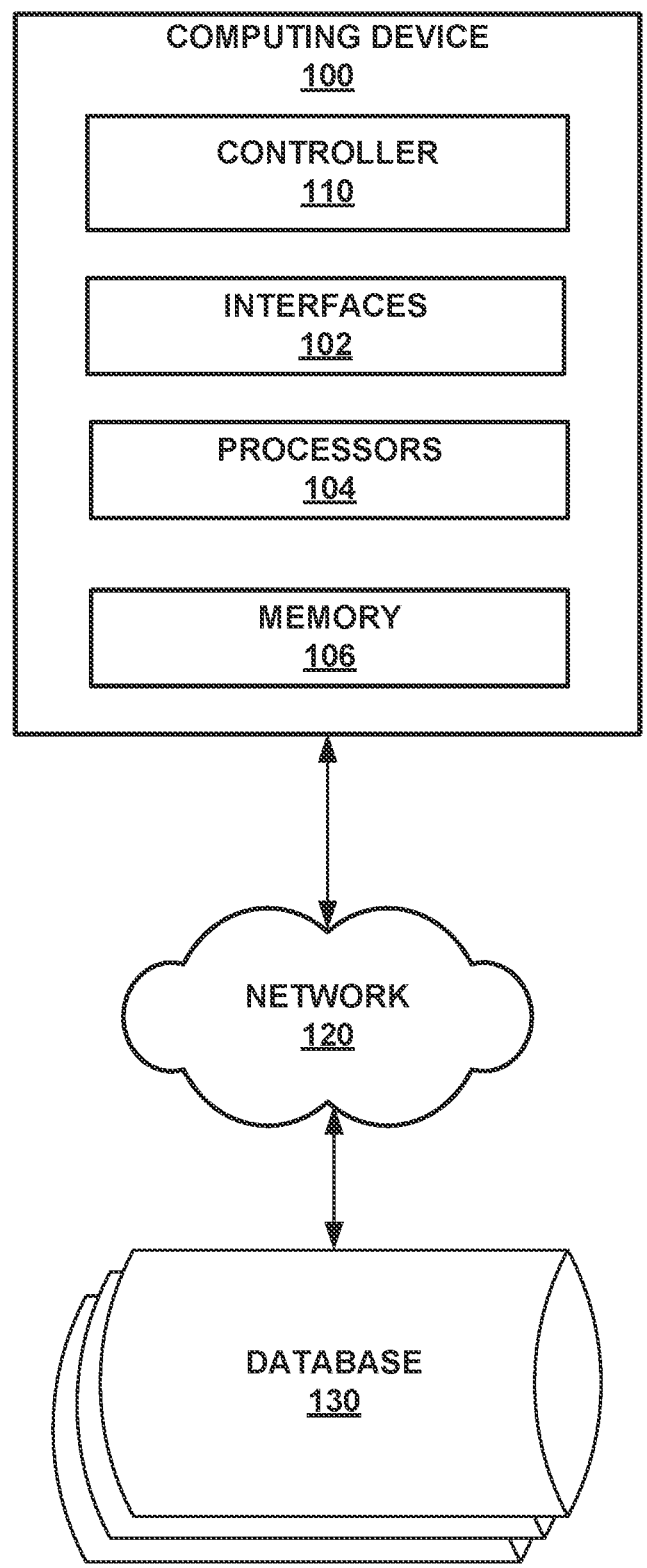
FIG. 1 is a block diagram illustrating an example computing system including a computing device configured to manage a plurality of unsearchable computer files, in accordance with the techniques of this disclosure.

In some examples, a database may include data that is stored in an unsearchable format. For example, the database may include computer files that are stored as images in .tiff or .jpg format, such that data of the computer file is not readily searchable by a computer that stores or accesses the data. Given that the data is stored in an unsearchable format, it may be difficult or impossible for a computing device to make use of all the information that is stored within the computer files. For example, it may be difficult or impossible for a computing device to retrieve, accurately classify, or thoroughly analyze a computer file that includes unsearchable data. In some examples, even if optical character recognition (OCR) is performed on data to enable a computing device to recognize text elements of a file, it may be difficult or impossible for a computing device to recognize non-textual attributes of the data, such as attributes based on the structure of the file itself. In such examples, a computing device may require the assistance of a human user in identifying portions of the stored data that are identifiable primarily or exclusively by their structure (i.e., relationship to other data) within the file.

For example, a user may have access to one or more databases that store a plurality of relatively unsearchable files. The user may require data stored on one or more of these files. For example, the files may be scanned images of printed documents, such as loan documentation, covenants, or product/policy renewals, to list a few examples. When the user directly accesses this database (e.g., when viewing files of a database using a computing device rather than searching the database for one or more files using a computing device), the user may need to manually visually inspect each image or file of the database to gather such data. Even if files of the database are minimally searchable (e.g., if files were text-searchable using OCR as described above), databases that store a relatively large number of files (e.g., 100,000 files) may require the user to develop a highly-customized search to ensure the return of all relevant files while excluding a maximized or otherwise increased number of non-relevant files. In some examples, even a highly-customized search may be impractical, depending upon the number of files within a database and/or the nature of files within a database (e.g., when files of a database have a high density of common terms across large numbers of files).

In general, this disclosure details techniques and systems for tagging computer files that include data stored in an unsearchable format such that a computing device may search the computer files for both specific text elements as well as "image verbiage" or structural data (e.g., data that is manifested through the relationship to other data). A computing device may crawl through the files of one or more databases to tag files with tags that indicate identified data.

The computing device may change tags over time in response to learning new structural relationships within and/or between different files. In some examples, the computing device may update or delete previously applied tags (e.g., on previously uploaded files of the database) based on a new understanding of tags as learned by the computing device. In certain examples, the computing device may further learn and identify shared and unshared data across a plurality of similar files to create and provide templates to a user related to a common file type or structure. Using techniques such as these, the computing device may become better at searching for and tagging files with increased use, such that the computing device may enable increased organizational, analytical, and recall capabilities over time.

FIG. 1 is a block diagram illustrating an example computing system including a computing device 100 configured to manage a plurality of unsearchable computer files, in accordance with the techniques of this disclosure. Computing device 100 includes controller 110, interfaces 102, processors 104, and memory 106. Computing device 100 may comprise a cluster of one or more computers, workstations, servers, and the like. Computing device 100 may be physically or virtually included within an internal network of an organization. Alternatively, computing device 100 may be physically or virtually included in a network hosted by a third-party vendor. For example, a vendor of an organization may store and maintain controller 110 for an organization and/or may provide the functions of controller 110 as a service to an organization. In some examples, controller 110 may be a software module or application that is executed by processors 104 of computing device 100 that is installed by a user or organization to manage files of the organization.

Computing device 100 is connected to network 120. Network 120 may comprise a private network including, for example, a private network associated with a financial institution. Alternatively, network 120 may comprise a public network, such as the Internet. Although illustrated in FIG. 1 as a single entity, in other examples network 120 may comprise a combination of public and/or private networks.

Computing device 100 may include one or more interfaces 102. Interfaces 102 may enable controller 110 to communicate with one or more databases (e.g., databases 130), devices, and/or one or more networks 120. In some examples, a single database 130 may include all transformed files and all transformation data, including data of the files received using OCR or NLP, relationship data or category data of respective files, and links to relevant exogenous data such as an in-house financial database (e.g., that stores customer account information) or data from a Banking-as-a-Service database. In some examples, the interface 102 and/or controller 110 may include a service data objects framework to ensure that logic modules within computer device 100 are accessed in a uniform way and access external modules/data/components in a uniform way. Interfaces 102 may include one or more network interface cards, such as Ethernet cards, and/or any other types of interface devices that can send and receive information. In some examples, controller 110 may utilize interfaces 102 to communicate with devices of a network 120, such as databases, third-party servers, financial-network servers, and/or any other suitable devices. Any suitable number of interfaces 102 may be used to perform the described functions according to particular needs.

Computing device 100 may include one or more processors 104 configured to implement functionality and/or process instructions for execution of controller 110. Processors 104 may include, for example, microprocessors, digital signal processors (DSPs), application specific integrated circuits (ASICs), field-programmable gate arrays (FPGAs), and/or equivalent discrete or integrated logic circuitry.

Computing device 100 may include memory 106 configured to store information within computing device 100. Memory 106 may include a computer-readable storage medium or computer-readable storage device. In some examples, memory 106 may include one or more of a short-term memory or a long-term memory. Memory 106 may include, for example, random access memories (RAM), dynamic random access memories (DRAM), static random access memories (SRAM), magnetic hard discs, optical discs, floppy discs, flash memories, or forms of electrically programmable memories (EPROM), or electrically erasable and programmable memories (EEPROM). In some examples, memory 106 may store logic (e.g., logic of controller 110) for execution by one or more processors 104. In further examples, memory 106 may be used by controller 110 to temporarily store information during program execution.

Controller 110 may include instructions executed by one or more processors 104 of computing device 100 to perform the functions of controller 110 as described herein. Controller 110 may be configured to manage a plurality of computer files. For example, according to the disclosed techniques, controller 110 may determine a plurality of tags for a plurality of unsearchable files. The plurality of files may be stored in one or more databases 130. Controller 110 may access and manage the plurality computer files through network 120. In some examples, a computer file of database 130 may be predominantly unsearchable prior to controller 110 tagging the computer file and predominantly searchable after controller 110 tags the computer file. For example, the file may be a scanned document that is in an image (e.g., .jpg or JPEG) format. Other examples are also contemplated by this disclosure, such as a file that has one or more unsearchable portions, even if another portion of the file already is searchable. For example, a file may be a searchable Microsoft Word (i.e., a .doc or .docx) file that has one or more unsearchable images (e.g., .jpeg or tiff images) within the file that may be tagged in accordance with the techniques of this disclosure. Alternatively, the file may be a searchable Microsoft Word file that is searchable throughout for textual data, but is not searchable for relationship (e.g., structural) data. However, for purposes of clarity, unsearchable data is predominantly discussed herein as being included in files that are predominantly unsearchable.

The plurality of tags may relate to both data (e.g., specific text) included in the unsearchable files as well as relationships between specific datum points included in each respective file of the unsearchable files (e.g., spatial alignment of data, geometric shapes, and/or other structure of a specific file). Controller 110 may tag the plurality of unsearchable files with the plurality of tags. In some examples, each of the unsearchable files may include at least one datum tag and at least one relationship tag of the plurality of tags. After tagging the files, controller 110 may be configured to search the plurality of files for one or more tags (e.g., in response to a search query from a user). Controller 110 may retrieve (e.g., retrieve from database 130 and then provide to a user) the files that contain the one or more tags of the search. In this way, controller 110 may transform a plurality of unsearchable files into searchable files that are searchable for both text and structure.

Further, controller 110 may detect if new unsearchable files are received (e.g., received by databases 130 that store the files over network 120 as sent by a user). In response to detecting the new files, controller 110 may tag the new unsearchable files with the plurality of tags. In some examples, controller 110 may add new tags or alter or delete the existing tags in response to receiving the new unsearchable files. A new tag may relate to a new datum or a new datum relationship. Controller 110 may update the tags on previously tagged files in response to determining new, updated, or deleted tags as appropriate (e.g., by tagging the new tags to respective stored files, updating previously tagged tags to respective stored files, or deleting previously tagged tags to respective stored files). By configuring controller 110 to autonomously (e.g., without user control or prompt) update, add, or delete tags throughout a plurality of files in response to receiving new unsearchable files and learning from the growing or changing collection of files, controller 110 may enable a coordinated and consistent tagging operation across each stored file that becomes more accurate over time.

In some examples, controller 110 may determine and provide one or more templates for a user. A template may be an editable file or a file with one or more editable fields (e.g., fillable fields) that include a plurality of common text (e.g., boilerplate language) in a common structure (e.g., a standardized document format) as found across numerous files of database 130. Controller 110 may create template in response to a search or query from a user. Controller 110 may identify data to be included within a template by comparing data of numerous files (e.g., files with a certain relationship tag as specified by the user in the query) to identify shared data, and generating the file to include substantially only that data that is shared across the numerous files.

Figure 2:
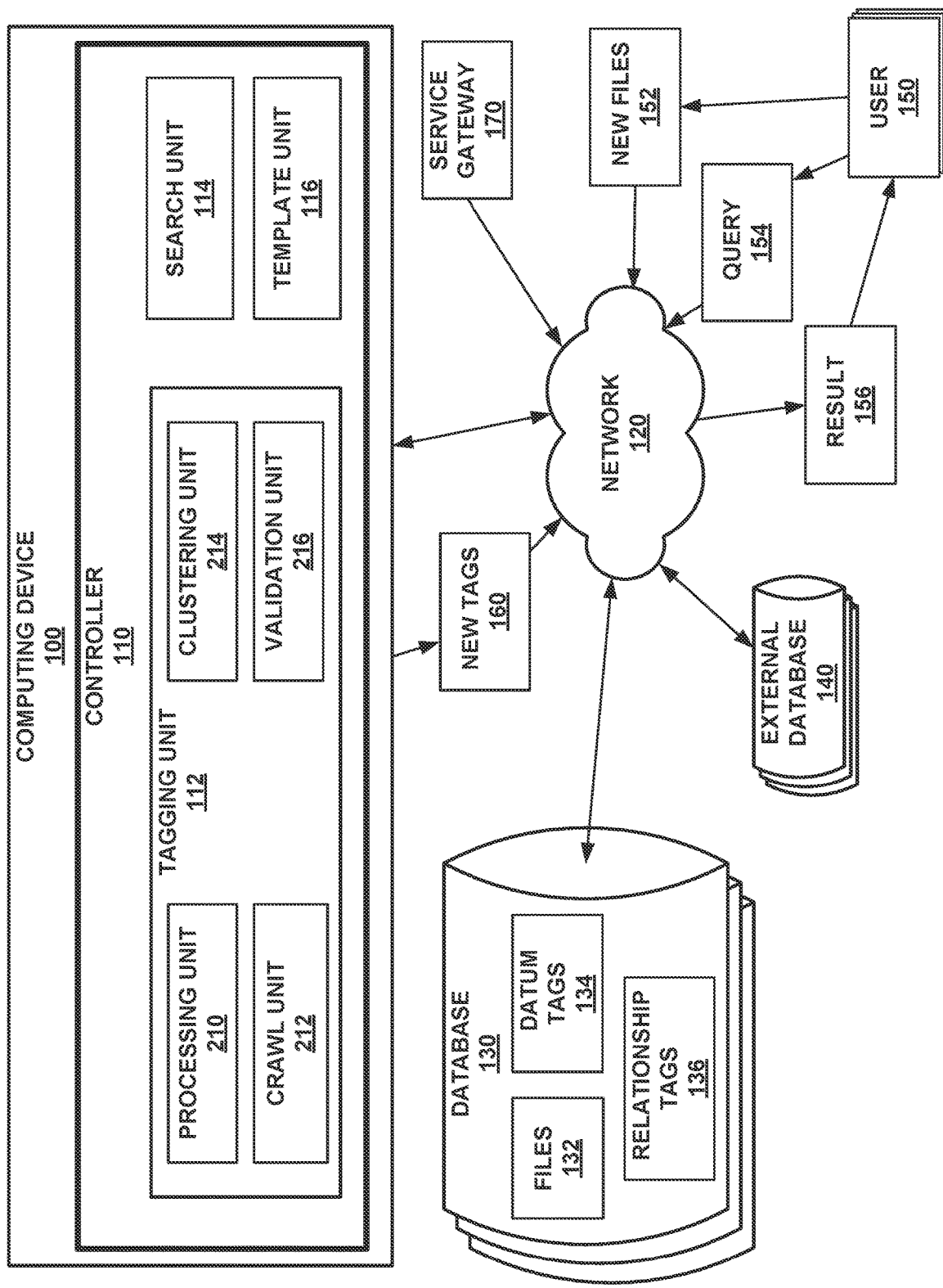
FIG. 2 is a block diagram illustrating the unsearchable computer file management computing device of FIG. 1 in greater detail.

FIG. 2 is a block diagram illustrating logic modules of an example data tagging system that includes computing device 100, network 120, and database 130 of FIG. 1. Though computing device 100 is not depicted within FIG. 2 as having interfaces 102, processors 104, or memory 106 as depicted in FIG. 1, it is to be understood that computing device 100 includes these or other components. In the example of FIG. 2, controller 110 includes tagging unit 112, search unit 114, and template unit 116, and tagging unit 112 further includes crawl unit 212, processing unit 210, transformer unit 214, cluster unit 214, and validation unit 216. Each of the logical units included in controller 110 may be stored as instructions within memory 106 and executed by processors 104 to perform the functions of controller 110 as described herein. The division of logic and duties as described within FIG. 2 is for purposes of illustration only, as one skilled in the art would understand that the duties and operations described herein could be divided among less or more individual modules, or the duties and operations could be divided among the same modules in different manners.

Tagging unit 112 may determine a plurality of tags for a plurality of files. Files 132 may be stored in an unsearchable format. For example, files 132 may be stored in TIFF, JPEG, or PDF Picture format, or any other format in which the data of file 132 (including either the text of a file or the structure of a file) is not readily recognizable or utilizable to a computing device (e.g., a computing device similar to computing device 100). For examples, files 132 may have originated from a collection of physical papers that one or more users 150 scanned into a computer and stored in database 130.

Tagging unit 112 may determine datum tags 134 that indicate data of one or more files 132. In some examples, tagging unit 112 may determine datum tags 134 that relate to customer names, customer accounts, monetary accounts, geographical locations, products, or the like. Tagging unit 112 may use optical character recognition (OCR) to identify each or many datum points of respective files 132. Tagging unit 112 may further use natural language processing (NLP) to identify synonymous (or nearly so) terms or clauses with substantially similar tags. In other examples, tagging unit 112 may tag every datum of every file 132 with a datum tag 134 (e.g., such that every word and number of file 132 is tagged). Some datum tags 134 may relate to a plurality of words, such as a specific datum tag 134 that indicates a first version of terms and conditions (e.g., such the first version of the terms and conditions are substantially similar across numerous files 132 that include the first version of the terms and conditions).

In certain examples, some or all datum tags 134 may be predetermined. Put differently, in some examples, tagging unit 112 may substantially or exclusively tag portions of data that substantially match a set of predetermined tags. For example, tagging unit 112 may have access to a list of products, customer names, customer accounts, or other datum types, such that tagging unit 112 tags each datum of respective files 132 that substantially matches at least one datum in a list (e.g., matches more a threshold amount when comparing using OCR and NLP techniques). The predetermined datum list may be stored in one location, such as in memory 106 of computing device 100. Alternatively, the predetermined datum list may be compiled from one or more external databases 140. For example, tagging unit 112 may access customer lists or product lists from various private (e.g., not publicly available) databases 140 connected to network 120, compiling relevant entities together into the predetermined datum list. Tagging unit 112 may access external databases 140 to compile the predetermined datum list over network 120.

Tagging unit 112 may also determine relationship tags 136 that relate to relationships between portions of data of respective files 132. In some examples, tagging unit 112 may tag a spatial arrangement or order arrangement of data within respective files 132 with one or more relationship tags 136. For example, tagging unit 112 may identify a relationship between a date on a top right of a first page of file 132 and a formal greeting (e.g., "Dear Mr. Smith,") on the top left of the first page, in response to which tagging unit 112 may tag the respective file 132 with an "official correspondence" relationship tag 136. For another example, tagging unit 112 may identify a spatial relationship between a box and a dollar amount within the box, in response to which tagging unit 112 may tag the respective file 132 with a "bill" relationship tag 136. Other types of relationship tags 136 are also possible.

Tagging unit 112 may tag files 132 that are stored in one or more databases 130. As discussed above, tagging unit 112 may access the one or more databases 130 over network 120. In some examples, datum tags 134 and relationship tags 136 (collectively "tags 134, 136) may be stored with files 132 at a respective database 130. Storing tags 134, 136 with files 132 at database 130 may provide storage or performance efficiencies in examples where there are numerous controllers 110 on numerous computing devices 100 accessing files 132 over network 120 (e.g., where controller 110 comprises numerous unique instances that reside on numerous computing devices 100). In such embodiments, tags 134, 136 may be stored as metadata of respective files 132 that is within or appended to respective files 132, or tags 134, 136 may be stored separate from files 132 and be tethered or mapped to respective files 132 within a log file. In other examples, tagging unit 112 may store tags 134, 136 locally within memory 106 of computing device 100 (not depicted).

Tagging unit 112 may detect or otherwise be notified when a new set of files 152 are added to database 130. For example, new set of files 152 may be added to database 130 over network 120. An authorized user 150 of database 130 may directly add new set of files 152. Alternatively, a user may add new set of files through service gateway 170, such as a Banking-as-a-Service (BaaS) gateway. In response to new set of files 152 being added to database 130, tagging unit 112 may tag new set of files 152 with tags 134, 136. In some examples, tagging unit 112 may determine if new tags 160 are required to properly tag new set of files 152. For example, new set of files 152 may include different relationships than are included within the current relationship tags 136, in which case tagging unit 112 may create new tag 160 and tag all files 132 that include the newly identified relationship(s).

Alternatively or additionally, tagging unit 112 may determine that some tags 134, 136 should be updated or deleted in response to analyzing new set of files 152. For example, controller 110 may identify that new set of files 152 alters a threshold percentage for including one or more tags 134, tags 136 (e.g., if relationship tags 136 are included when they are shared across 20% of files 132, a relatively large new set of files 152 that does not include one or more respective relationship tags 136 may result in the one or more respective relationship tag 136 being shared across only 19% of files 132, such that controller 110 deletes the one or more respective relationship tag 136 from stored files 132 of database 130). For another example, controller 110 may have previously determined two datum points (e.g., can and may) of files 132 to be substantially synonymous, such that controller 110 tagged both datum points with a single datum tag 134 in files 132. However, upon analyzing new set of files 152, controller 110 may determine that the two datum points indicate different things (e.g., can is used to described a thing that is currently possible with a particular system, and may is used to describe a thing that is potentially possible with a potential system), such that two datum tags 134 are appropriate for the two datum points within files 132 of database 130. In response to this determination, controller 110 may retag files 132 that included the two datum points with respective datum tags 134.

In some examples, tagging unit 112 may include a plurality of individual logic modules. These logic modules may execute some of the functionality described above, in conjunction with the additional functionality described below. For example, tagging unit 112 may include processing unit 210 that "cleans" files 132 or identifies datum points of files 132 (e.g., using OCR or NLP), crawl unit 212 that navigates through files and eventually tags files 132 with tags 134, 136, clustering unit 214 that determines datum tags 134 and relationship tags 136, and validation unit 216 that validates the accuracy of tags 134, 136. In some examples, the logic modules of tagging unit 112 may functional as a logical pipeline, transferring data between logic modules in an ordered manner to reliably and predictably take data from, for example, an input stage to a processing stage to a storage or output stage. By structuring modules or operations of tagging unit 112 to function as a pipeline, controller 110 may increase an accuracy and precision of applying and managing a plurality of tags 134, 136 for a plurality of files 132. Tagging unit 112 may also verify that requests between processing unit 210, crawl unit 212, clustering unit 214, and validation unit 216 have valid formal semantics. By verifying valid formal semantics, tagging unit 112 may reduce the chances of a tagging operation encountering delays, mistakes, computational errors, or tagging errors.

Controller 110 may cause processing unit 210 to process files 132. Processing unit 210 may execute such processing actions as denoising (e.g., removing "static" from an image), executing optical character recognition, executing vector techniques, or the like. In some examples, controller 110 may cause processing unit 210 to process each file 132 as soon as controller 110 detects that database 130 receives the respective file 132. In other examples, controller 110 may only cause processing unit 210 to process files 132 in response to processing unit 210 identifying such files 132 as requiring processing (e.g., as a result of data of respective files 132 being difficult to identify).

In some examples, the processing unit 210 may learn how to improve processing files 132, and/or processing unit 210 may be trained to improve at processing files 132. For example, user 150 may provide (e.g., over network 120) a "clean" example of documents for processing unit 210 to emulate. Processing unit 210 may determine thresholds for what is and isn't considered noise, for example, based on the "clean" example. For another example, processing unit 210 may use files 132 of database 130 that have a relatively high number of tags 134 as an example of a well-processed file 132 (e.g., as such files 132 were presumably processed well enough to identify a relatively large number of datum points in order to apply a relatively high number of tags 134) to establish processing thresholds. Training the processing unit 210 to improve processing capabilities may improve the reliability and accuracy of downstream operations, such as clustering files 132.

Tagging unit 112 may include crawl unit 212. Crawl unit 212 may be a logical module that is configured to crawl through databases 130 in a systematic and efficient manner while analyzing and retrieving data of files 132 and/or of databases 130. In some examples, processing unit 210 may use crawl unit 212 to identify and retrieve files 132 that have not been pre-processed or tagged with tags 134.

Crawl unit 212 may detect some individual files 132 of database 130 include a plurality of documents. For example, user 150 may have scanned numerous distinct documents into a single file 132 which the user then uploaded to database 130. Crawl unit 212 may identify that this single file 132 includes a plurality of documents, and may therein divide the single file 132 into a plurality of files 132 that each include one of the plurality of documents. Alternatively, crawl unit 212 may individually crawl through, analyze, and tag each document of the single file 132 as if the document were a unique file 132 (though the plurality of documents is entirely within the single file 132).

Crawl unit 212 may identifying files 132 that has been processed but not tagged. Upon crawl unit 212 identifying untagged file 132, tagging unit 112 may cause clustering unit 214 to determine tags 134, 136 of untagged file 132. Crawl unit 212 may provide the data of untagged file 132 (e.g., as identified through processing unit 210) to clustering unit 214 to determine tags. Clustering unit 214 may determine tags 134, 136 by "clustering" files 132. Specifically, clustering unit 214 may determine tags 134, 136 by clustering together subsets of files 132 that have relatively similar data or structures. Clustering unit 214 may utilize various algorithms to cluster files 132. For example, clustering unit 214 may use K-means, k-NN algorithms, or the like. In some examples, clustering unit 214 may use regression models to determine or predict file 132 subsets (e.g., by finding causal effect relationships between datum points when files 132 are evaluated in different ways). Alternatively, clustering unit 214 may utilize deep learning neural networks to cluster files 132 into subsets. In some examples, clustering unit 214 may use multiple algorithms to cluster files 132 to create additional clusters or additional confidence of determined subsets of files 132.

Clustering unit 214 may cluster together various types of subsets to determine different types of tags 134, 136. For example, clustering unit 214 may cluster subsets of files 132 by spatial relationships between datum points 132 where datum points have specific spatial relationships (e.g., where files 132 are an image rather than a .txt format) to determine relationship tags 136. For another example, cluster unit 214 may cluster subsets of files 132 in response to determining similar groups of text after processing unit 210 executes OCR on files 132 to determine datum tags 134. Examples of subsets may be files 132 of similar document type, files 132 that share a customer ID, files 132 that share a loan number, files 132 that share a certain set of terms and conditions, files 132 that are covenants, files 132 that include signatures, or the like. Clustering unit 214 may determine whether each of these subsets should be datum tags 134 or relationship tags 136. A list of datum tags 134 and/or relationship tags 136 as determined by clustering unit 214 may be stored on memory 106 of computing device. Alternatively, a list of datum tags 134 and/or relationship tags 134 as determined by clustering unit 214 may be stored on databases 130 that store respective files 132.

In response to clustering unit 214 determining tags 134, 136, controller 110 may cause clustering unit 214 to provide tags 134, 136 to crawl unit 212 so that crawl unit 212 may tag respective files 132 with the determined tags 134, 134. In some examples, controller 110 may only cause crawl unit 212 to tag files 132 a single time. In other examples, controller 110 may cause crawl unit to tag files 132 two or more times. For example, controller 110 may detect that files 132 should be recrawled (e.g., by crawl unit 212) to search for more data in response to a triggering event. The triggering event could be related to clustering unit 214 determining, altering, or deleting one or more tags 134, 136. For example, controller 110 may receive correction from user 150 that one or more identified tags 134, 136 for a certain set of data are incorrect, as the certain set of data should be instead tagged with a different set of tags 134, 136. In such examples, controller 110 may cause crawl unit 212 to crawl through files 132 that include the one or more identified tags 134, 136 to verify accuracy or update as necessary. In response to crawl unit 212 tagging files 132, tagging unit 112 may store a link or path to these files 132 (as well as any relevant tags 134, 136) within database 130 or memory 106 of computing device 100. In some examples, tagging unit 112 may also include a link or path to data of one or more external databases 140 that is relevant to tags 134, 136 and/or files 132 (e.g., a customer database 140 that relates to a customer that is tagged in a respective file 132). Tagging unit 112 may control read/write privileges to these links or paths.

Tagging unit 112 may include a validation unit 216 that compares determined tags 134, 136 to one or more predetermined subsets of files 132. The validation unit 216 may verify that at least one determined tags 134, 136 correlates to respective files 132 of the predetermined subsets of files 132. Put differently, if user 150 desires or requires that controller 110 be configured to identify a certain datum tag 134 and/or relationship tag 136, user 150 may submit a set of files 132 that include this datum and/or relationship to ensure that the datum and/or relationship is identified as taggable. The predetermined subsets of files 132 may be stored in memory 106 or within one or more databases 130.

Alternatively, the predetermined subsets of files 132 may be received over network 120 from user 150 and temporarily saved on a cache before being confirmed and discarded.

If the validation unit 216 determines that there is not at least one determined relationship tag 134, 136 that correlates to one of the predetermined subsets of files 132, validation unit 216 may cause clustering unit 214 to cluster files 132 again to create a subset of files 132 (and therein a datum tag 134 or relationship tag 136) related to the respective predetermined subset of files 132. If clustering unit 214 executes a clustering operation for a specific predetermined classification and does not identify any files 132 to cluster, clustering unit 214 may send an alert (e.g., to user 150) to indicate that the relationship is not represented in database 130 (e.g., being as it may be expected that files 132 may include at least one file 132 for each predetermined subset of files 132).

Alternatively, validation unit 216 may validate tags 134, 136 based on input from user 150. For example, controller 110 may provide tags 134, 136 that were determined by clustering unit 214 and tagged to respective files by crawl unit 212 to user 150 substantially immediately upon files 132 being authored or saved by user 150, such that the authoring/saving user 150 may immediately alter, delete, add, or approve (and therein leave) respective tags 134, 136 as is appropriate for the respective file 132. Validation unit 216 may track whether tags 134, 136 are approved, altered, deleted, or added. By tracking whether user 150 approved, altered, deleted, or added tags 134, 136 for a respective file 132 over numerous iterations (e.g., iterations with similar tags 134 or data), validation unit 216 may improve at validating tags 134, 136 over time.

Once files 132 of database 130 are fully tagged by tagging unit 112, controller 110 may enable files 132 of database to be searched. For examples, controller 110 may include search unit 114 that is configured to search for files 132 of database 130. Search unit 114 may search files 132 of the one or more databases 130 for one or more tags 134, 136. For example, search unit 114 may execute a search for files 132 of database 130 that include a loan number or customer ID. Search unit 114 may search with an open query that returns all files 132 that includes tags 134 of the search.

Search unit 114 may search files 132 for one or more tags 134, 136 in response to search or query 154. An authorized user 150 may send query 154 over network 120. Alternatively, query 154 may be sent from service gateway 170, such as a BaaS gateway. Query 154 may indicate the one or more tags 134, 136 that search unit 114 will search for. Search unit 114 may retrieve any files 132 that include the one or more tags 134, 136 of query 154 and provide results 156 to user 150. In some examples, search unit 114 may provide results 156 to user 150 through service gateway 170 (e.g., where user 150 is accessing database 130 through BaaS gateway). Search unit 114 may access files 132 of database 130 over network 120 using interface 102. In some examples, as depicted, search unit 114 may receive query 154 from user 150 over network 120. In other examples, user 150 may use computing device 100 to provide query 154 to search unit 114 through an input interface 102 (e.g., a keyboard and/or a mouse). Searches of search unit 114 may be standardized, such that repeated and substantially similar queries 154 of a substantially similar database 130 with substantially similar files 132 and tags 134, 136 may return substantially similar results every time.

Controller 110 may further include template unit 116. Template unit 116 may generate a template in response to query 154 from user 150 for a template. Query 154 may indicate one or more tags 134, 136 the template is to be based on. Template unit 116 may compare data of files 132 that include tags 134, 136 of query 154. Template unit 116 may identify a subset of this compared data that is shared among files 132 by more than a threshold percentage of files 132. Template unit 116 may generate a template and provide template results 156 to user 150. Generated template may include shared or common data of the compared files 132. Template may be similar to a fillable form (e.g., a PDF file with fields that can be filled in). For example, query 154 from user 150 may include a request for a formal correspondence bill, in which case template unit 116 may cross-compare files 132 that include formal correspondence relationship tags 136 or bill relationship tags 136 to create a fillable form that is structured similar to these files 132. In some examples, template unit 116 may be configured to create templates in a variety of file formats (e.g., PDF, DOC, XLS, etc.) to execute query 154 of user 150.

Figure 3:
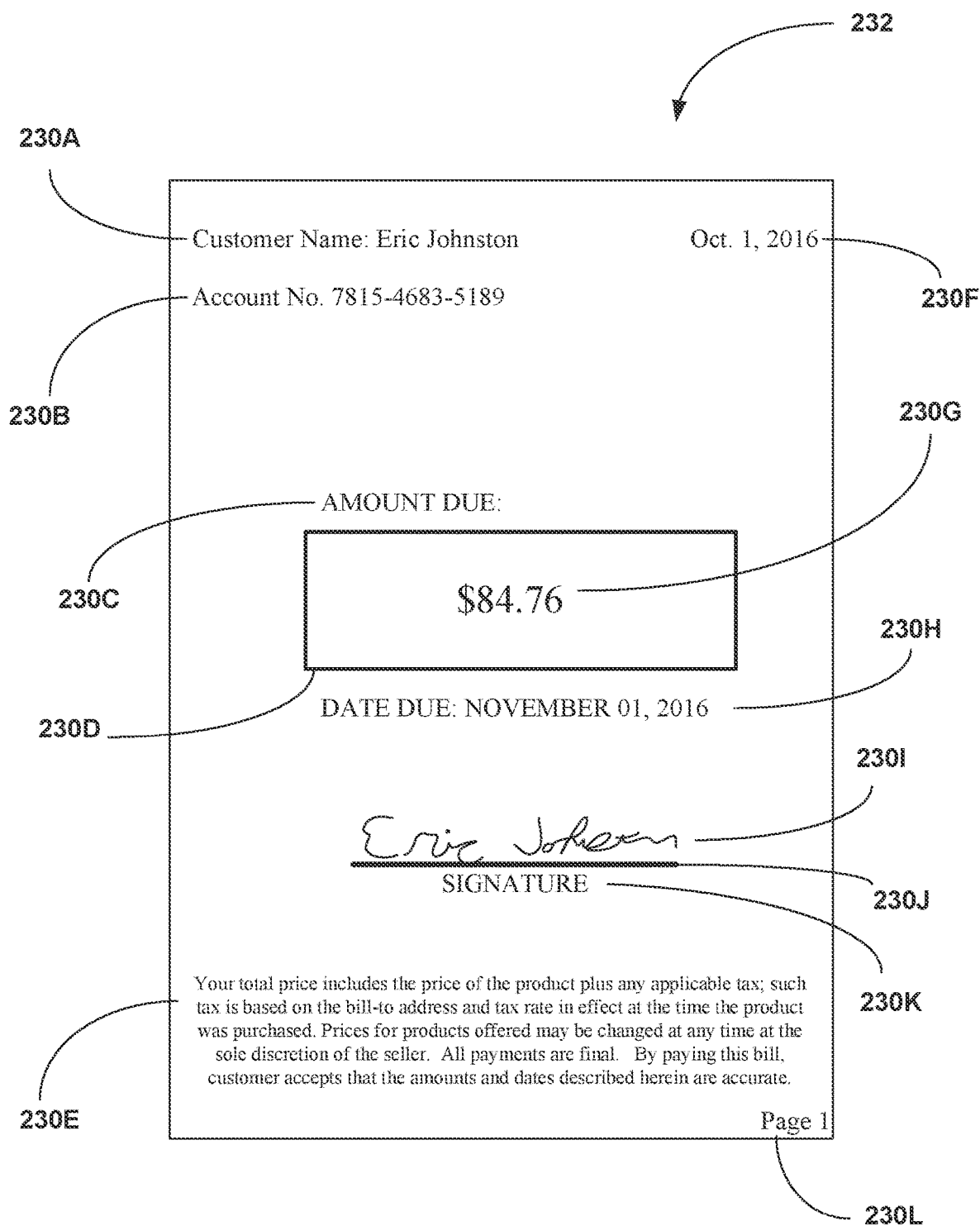
FIG. 3 is a conceptual diagram illustrating an example file that may be managed by the computing device of FIGS. 1 and 2, in accordance with the techniques of this disclosure.

FIG. 3 is a conceptual diagram illustrating an example file 232 that may be managed by computing device 100 of FIGS. 1 and 2. File 232 may be substantially similar to files 132 described above. File 232 may relate to a monetary bill for a service (e.g., as depicted, file 232 is a bill for Eric Johnston for $84.76). Tagging unit 112 may identify a number of datum points 230A-230L (collectively "datum points 230"). Datum points 230 may include any portion of text that is recognized by tagging unit 112 through OCR (e.g., as a result of processing unit 210), whether typed or handwritten (e.g., signature datum 230I). Further, in some examples datum points 230 may include other notable geometric shapes. For example, tagging unit 112 may detect box datum 230D as well as line datum 230J. Tagging unit 112 may identify geometric shapes that satisfy a threshold thickness or straightness (e.g., as such thickness or straightness may eliminate geometric shapes are background noise from the scanning/input process).

In some examples, each datum 230 of file 232 may be tagged with tag 134 (e.g., as tagged by crawl unit 212). In other examples, only some datum points 230 of file 232 may be tagged. For example, tagging unit 112 may detect that terms and conditions datum 230E are boilerplate, such that it may not be necessary to tag each specific datum/word of the terms and conditions with a separate tag 134. Instead, tagging unit 112 may tag terms and conditions datum 230E with a single tag 134 that identifies datum 230E as terms and conditions, or one of several iterations of terms and conditions (e.g., where clustering unit 214 determines numerous variations of terms and conditions datum tags 134 and recognizes datum 230E as one of these variations).

Tagging unit 112 may determine (e.g., using clustering unit 214) relationships between datum points 230. For example, tagging unit 112 may determine that customer name datum 230A is on the top left of file 232, while current date datum 230F is on the top right of file 232, while box datum point 230 is in the center of file 232. Tagging unit 112 may determine this relationship and therein tag the file with the relationship tag 136 "bill." In some examples, tagging unit 112 may initially provide relationship tags 136 with generic iterating names (e.g., RELATIONSHIP TAG 000053-AB) and then enable user 150 to rename individual tag 134, 136 names.

As described herein, tagging unit 112 may identify this relationship by cross-comparing a plurality of files 132 and determining that a threshold number of files 132 included this relationship. For example, tagging unit 112 may initially analyze a plurality of files 132 to tag all word and geometric datum points 230 and identify all relationships of the plurality of files 132, after which tagging unit 112 may tag all relationships that occurred in a threshold number of files 132 (e.g., more than 100 files 132). Tagging unit 112 may temporarily or permanently store a number of files 132 that include the analyzed relationship in memory 106. In some examples, as more files 132 are added to database 130, a relationship that previously was not within a threshold number of files 132 may surpass the threshold number as additional files 132 are added, such that all files 132 within the database 130 that include the relationship may now be tagged as such.

Further, in some examples, tagging unit 112 may identify a relationship by cross-comparing the plurality of files 132 and determining that the relationship was detected in more than a lower threshold number of files while also being detected in less than an upper threshold percentage of files. For example, tagging unit 112 may determine a relationship of a page number datum 230L on bottom right of file 232 and terms and conditions 230E immediately above page number datum 230L. Tagging unit 112 may then determine that over 90% of files 132 within database 130 include this relationship, when the maximum threshold is 60%. Accordingly, tagging unit 112 may not create relationship tag 136 for this relationship.

In some examples, template unit 116 may create a template based off of one or more files 132 with one or more common or shared relationship tags 134. For example, template unit 116 may compare a number of files 132 that each share one or more relationship tags 136 and remove any unshared datum points 230. Further, template unit 116 may include a fillable field (e.g., a text field for future text entry by a user) in places where unshared datum points 230 were removed.

Figure 4:
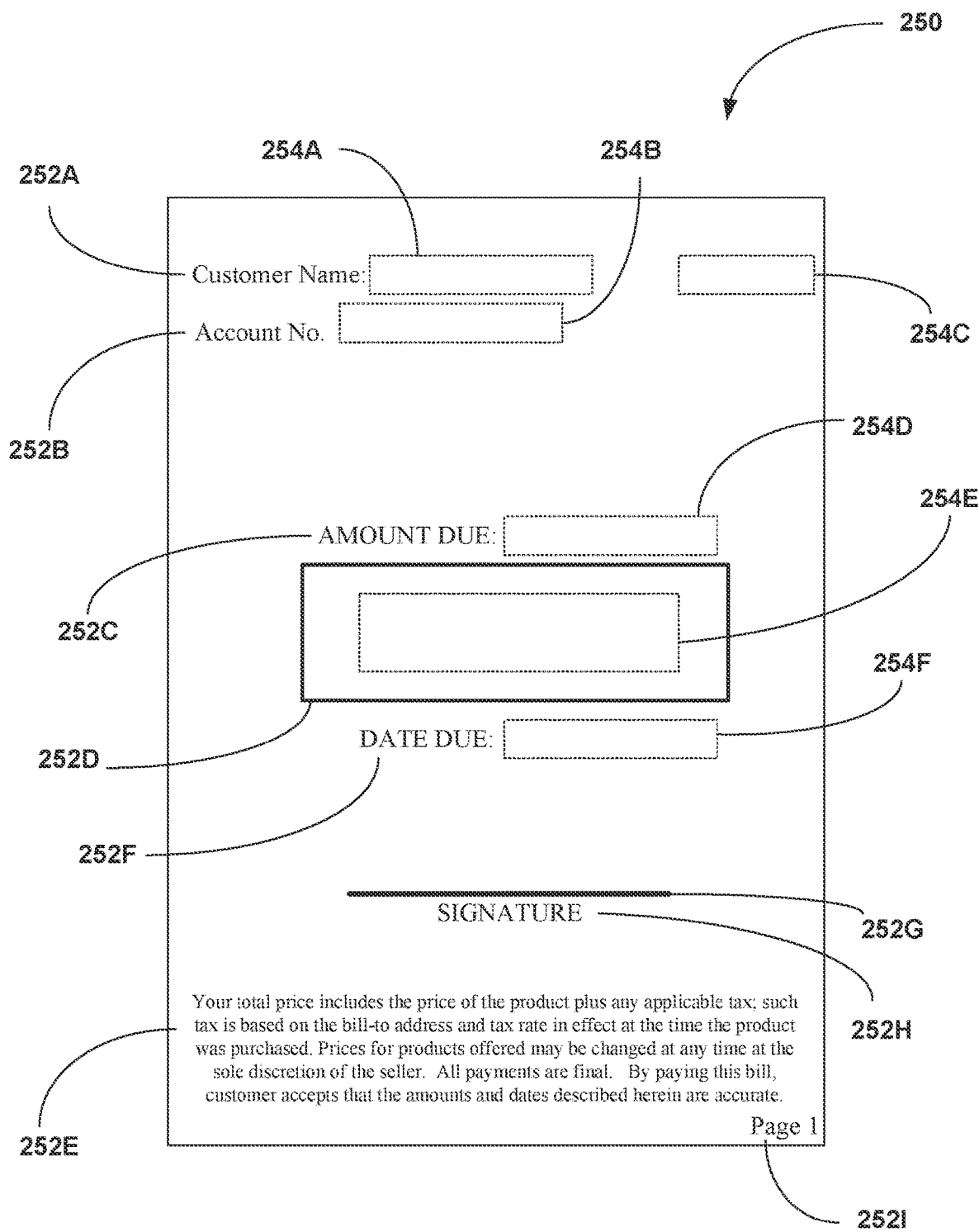
FIG. 4 is a conceptual diagram illustrating an example template that may be created by the computing device of FIGS. 1 and 2, in accordance with the techniques of this disclosure.

For example, FIG. 4 depicts an example template 250. Template unit 116 may create template 250 from file 232 as well as other files that shared one or more relationship tags 134 with file 232. Template 250 may be stored in an editable format, such as .doc, .docx, .pdf, or the like. Template 250 may include one or more shared datum points 252A-252I (collectively "shared datum points 252"). Shared datum points 252 may be datum points that were substantially shared by files 132 from which template 250 was created. For example, template unit 116 may determine that 90% of files 132 with relationship tag 134 "bill" include datum 230C "AMOUNT DUE:", where the threshold amount was 80%. Accordingly, template unit 116 may include within template 250 shared datum 252C "AMOUNT DUE:", as 90% of files 132 was more than the threshold amount of 60% of files 132.

Template 250 may include numerous fillable fields 254A-254F (collectively fillable fields 254). Fillable fields 254 may be fields within template 250 that are easily editable at a later time by user 150 (e.g., by inserting text using a computer). Template unit 116 may create fillable fields 254 for datum points 230 that were relatively unshared/uncommon among files 132 that included the relevant relationship. For example, as depicted in FIG. 4, template unit 116 replaced date datum 230F with fillable field 254C. As discussed above, template unit 116 replaced date datum 230F with fillable field 254C after determining that some or all of respective datum points 230 were not common/shared across files 132 with the respective tag 134. In some examples, a single unshared datum 230 may be sufficient to replace the respective unshared datum with a fillable field 254 on template 250. In other examples, template unit 116 may only replace datum points 230 with fillable fields 254 after detecting a threshold number or percentage of unshared datum points 230 (e.g., only replacing respective datum points 230 upon detecting ten separate instances where respective datum points 230 were unshared, or only replacing respective datum points 230 upon detecting that 20% of datum points 230 are unshared).

In certain examples, template unit 116 may detect that certain portions of datum points 230 are shared while other portions of the same datum points 230 are unshared. For example, template unit 116 may detect that first portion "Customer Name:" of datum 230A was always shared, while second portion "Eric Johnston" of datum 230A was infrequently or never shared. In response to detecting that a first portion of a datum 230 is shared and a second portion is unshared, template unit 116 may keep the shared portion in template 250 as a shared datum 252A and replace unshared portion with fillable field 254A.

In some examples, template unit 116 may further determine to remove some datum points 230 from files 232 without replacing these datum points 230 with a fillable field 254. Template unit 116 may remove (and not replace) data that relates to markings that comes after respective files 132 were physically printed, such as signatures, initials, stamps, checkmarks, and the like. In some examples, template unit 116 may detect such marks by a relative inconsistency in the thickness of lines (e.g., as such lines may indicate markings made by hand). For example, as depicted in FIG. 4, template unit 116 removed signature datum 230I without replacing signature datum 230I with a fillable field 254 within template 250.

Figure 5:
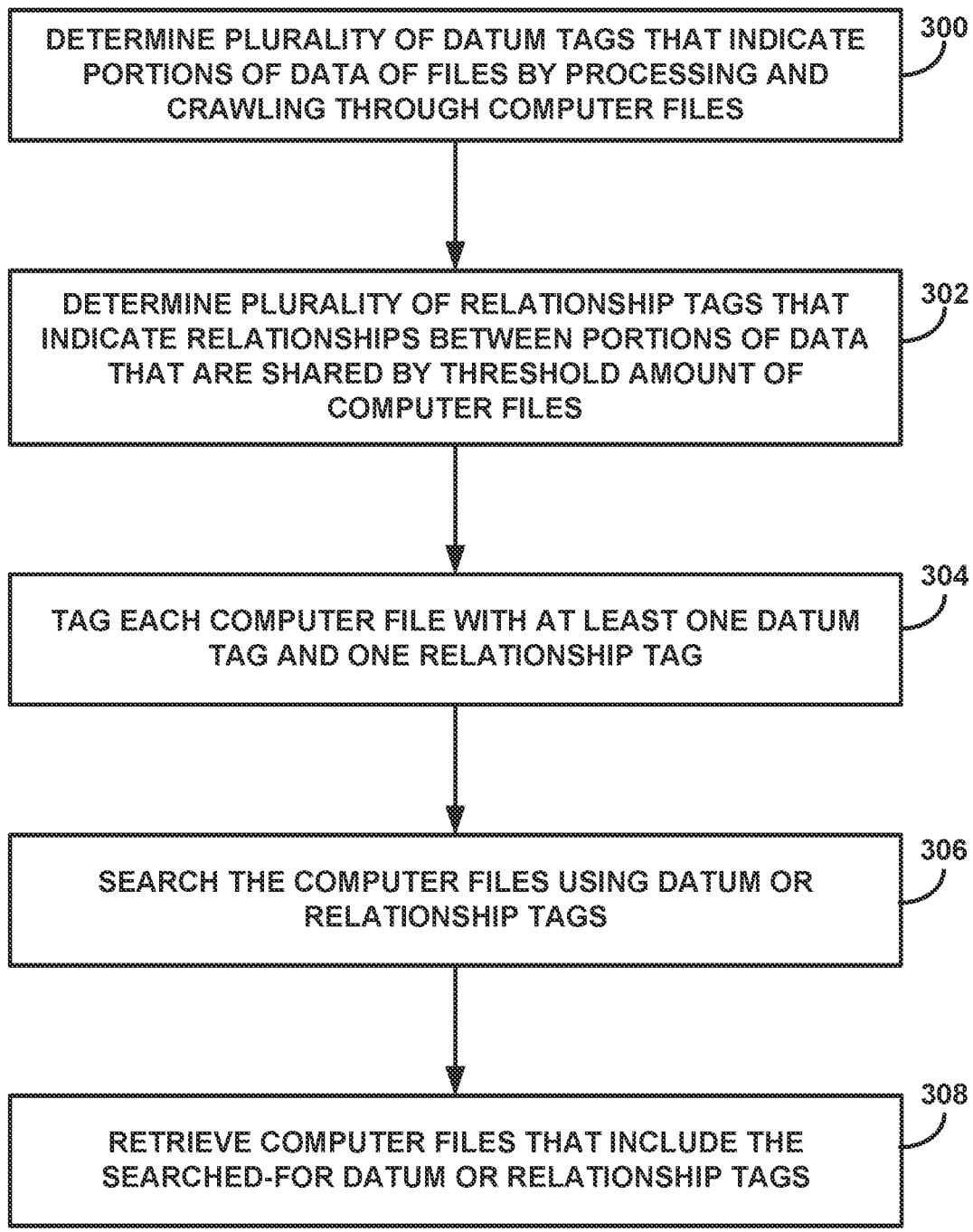
FIG. 5 is a flowchart illustrating an example method of managing a plurality of unsearchable computer files in accordance with the techniques of this disclosure.

FIG. 5 is a flowchart illustrating an example method of managing a plurality of files that are in stored in unsearchable format. The example method is described with respect to FIG. 1. The plurality of files may be managed by controller 110 of computing device 100.

Controller 110 may determine a plurality of datum tags 134 by analyzing a plurality of files 132 (300). Files 132 may be stored in an unsearchable format, or may include portions of data that is stored in an unsearchable format. Tagging unit 112 of controller 110 may crawl through files 132 and process (e.g., clean) files so that data of files 132 may be identified. Once files 132 are processed, tagging unit 112 may determine a plurality of tags for files 132, and apply the tags to files 132. The tags may include datum tags 134 that indicate specific portions of data (e.g., datum points 230 of FIG. 3) of a file 132. To identify specific portions of data, tagging unit 112 may execute optical character recognition techniques on respective files 132.

Additionally or alternatively to the tags including datum tags 134 that indicate data, the tags may include relationship tags 136 that indicate relationships between specific datum points of a file 132 (302). Relationship tags 136 may relate to spatial relationships, sequential order relationships, or other types of relationships consistent with the discussion herein. In some examples, tagging unit 112 (e.g., clustering unit 214 of tagging unit 112) may determine that a relationship should be tagged with relationship tag 136 in response to determining that a threshold number or percentage of files 132 include the relationship. In certain examples, tagging unit 112 may further verify that a relationship should be tagged by verifying that the relationship does not exist in more than a threshold percentage of files 132 (e.g., such that a relationship is too common across files 132 of database 130 to be useful in sorting or retrieving files 132 of database 130).

Tagging unit 112 may improve at tagging files 132 with datum tags 134 and/or relationship tags 136 (collectively, "tags 134, 136") over time. For example, tagging unit 112 may both improve at determining when respective files 132 should be tagged with respective tags 134, 136, and tagging unit 112 may develop improved tags 134, 136 over time, such that improved tags 134, 136 contain a higher amount of unique identifying information and a lower amount of common information. Tagging unit 112 may improve at tagging files 132 by supervised learning, where user 150 corrects or changes tags 134, 136 of tagging unit 112 such that tagging unit 112 is less likely to repeat what has been corrected or changed. Alternatively or additionally, tagging unit 112 may improve at tagging files 132 by tracking what datum points 230 are included in what files 132 within what relationships, therein analyzing the patterns of datum points 230 of files 132 over time to identify and determine tags 134, 136 that are more germane to specific groups of files 132.

In some examples, tagging unit 112 may determine that additional files 132 that include unsearchable data have been added to database 130. In response to this determination, tagging unit 112 may tag the newly added files 132. In some examples, tagging unit 112 may learn new tags 134, 136 as a result of the newly added files 132. In such examples, tagging unit 112 may tag previously received files 132 with new tags 134, 136 as appropriate.

Tagging unit 112 may tag each computer file 132 with at least one datum tag 134 and at least one relationship tag 136 (304). Tags 134, 136 may be stored with files 132 (e.g., rather than locally in memory 106 with tagging unit 112). Tags 134, 136 may be stored in a searchable format. Search unit 114 of controller 110 may search database 130 for files 132 with certain tags 134, 136 (306). Search unit 114 may search database 130 for files 132 with certain tags 134, 136 in response to a search or query 154 from user 150. Query 154 from user 150 may come over network 120. Search unit 114 may retrieve computer files 132 that include tags 134, 136 and provide them to the user (308).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Techniques of this disclosure may provide one or more technical advantages. For example, certain techniques of this disclosure may, in some instances, provide a technical solution to managing a database of files that include unsearchable data. For example, by tagging both datum points and structural relationships of files and configuring a tagging system to improve at tagging over time, a system may demonstrate advantages in identifying, organizing, analyzing, and retrieving data in response to user queries.

Various examples have been described. These and other examples are within the scope of the following claims.

What is claimed is:

1. A computer-implemented method comprising:
   receiving at least one training document that includes a first plurality of tags, wherein the at least one training document corresponds to a document type, and wherein the first plurality of tags includes one or more first datum tags that each indicates a datum point of a first plurality of datum points of the at least one training document and one or more first relationship tags that each indicates a spatial relationship between the first plurality of datum points of the at least one training document;

determining, for a plurality of computer files that include data stored in one or more unsearchable formats, a second plurality of tags by:

applying natural language processing to identify a second plurality of datum points included in each computer file of the plurality of computer files, wherein the natural language processing is applied to at least two different computer files of the plurality of computer files, clustering the plurality of computer files and the at least one training document into one or more subsets of computer files having similar spatial relationships between the second plurality of datum points within the respective computer file of the plurality of computer files, wherein the at least two different computer files are clustered into a same subset of the one or more subsets of computer files, and wherein the same subset of the one or more subsets of computer files includes textual data defined by a predetermined category of data, and generating the second plurality of tags based on the clustering of the plurality of computer files into the one or more subsets of computer files, wherein generating the second plurality of tags includes generating at least one textual datum tag that indicates different but synonymous terms or clauses of the textual data in the predetermined category of data included in the at least two different computer files, wherein the second plurality of tags includes one or more second datum tags that each indicates a datum point of the second plurality of datum points of at least one computer file of the plurality of computer files and one or more second relationship tags that each indicates a spatial relationship between data the second plurality of datum points of the at least one computer file of the plurality of computer files, wherein each of the plurality of computer files corresponds to a textual document, and wherein the one or more second datum tags includes the at least one textual datum tag;

tagging each computer file of the plurality of computer files based on the determined second plurality of tags such that each computer file is associated with at least one of the second datum tags of the second plurality of tags and at least one of the second relationship tags of the second plurality of tags, wherein the at least two different computer files are tagged with the at least one textual datum tag;

searching the plurality of computer files for the at least one textual datum tag of the second plurality of tags; and retrieving, in response to the searching, a subset of the plurality of computer files that contain the at least one textual datum tag of the second plurality of tags.

2. The method of claim 1, further comprising determining, prior to determining the second plurality of tags, a noise threshold based on the at least one training document, wherein the second plurality of datum points included in the computer file of the plurality of computer files exceed the noise threshold.

3. The method of claim 1, further comprising determining the first plurality of tags of the at least one training document.

4. The method of claim 1, wherein at least some of the one or more datum first tags each indicates a plurality of data included in the at least one computer file.

5. The method of claim 1, wherein generating each second relationship tag of the one or more second relationship tags includes identifying a data relationship that is shared by more than a threshold number of computer files of the plurality of computer files, and generating the respective second relationship tag that indicates the data relationship.

6. The method of claim 5, wherein determining the second plurality of tags includes identifying a data relationship that is shared by less than a threshold percentage of computer files of the plurality of computer files.

7. The method of claim 1, further comprising:

detecting that a new set of computer files that include data stored in one or more unsearchable formats has been added to the plurality of computer files;

determining, for the plurality of computer files, an updated second plurality of tags in response to adding the new set of computer files to the plurality of computer files, wherein determining the updated second plurality of tags includes identifying a relationship between data included in at least one computer file of the new set of computer files that is different than the data relationship indicated by any of the existing second relationship tags, and generating a new second relationship tag that indicates the new data relationship; and tagging each computer file of the plurality of computer files based on the updated second plurality of tags.

8. The method of claim 1, wherein searching the plurality of computer files further comprises searching the plurality of computer files for a selected one of the second relationship tags, and wherein retrieving the subset of the plurality of computer files comprises retrieving the subset of files that are all tagged with the selected second relationship tag, the method further comprising:

comparing a set of data included in the subset of files that are all tagged with the selected second relationship tag;

identifying a subset of the data included in the subset of files that is shared by a threshold percentage of the subset of files; and generating an editable computer file template that includes the subset of the data included in the subset of files.

9. A computing device comprising:

at least one processor; and a memory coupled to the processor, the memory storing instructions that, when executed, cause the at least one processor to:

receive at least one training document that includes a first plurality of tags, wherein the at least one training document corresponds to a document type, and wherein the first plurality of tags includes one or more first datum tags that each indicates a datum point of a first plurality of datum points of the at least one training document and one or more first relationship tags that each indicates a spatial relationship between the first plurality of datum points of the at least one training document;

determine, for a plurality of computer files that include data stored in one or more unsearchable formats, a second plurality of tags by:

applying natural language processing to identify a second plurality of datum points included in each computer file of the plurality of computer files, wherein the natural language processing is applied to at least two different computer files of the plurality of computer files, clustering the plurality of computer files and the at least one training document into one or more subsets of computer files having similar spatial relationships between the second plurality of datum points within the respective computer file of the plurality of computer files, wherein the at least two different computer files are clustered into a same subset of the one or more subsets of computer files, and wherein the same subset of the one or more subsets of computer files includes textual data defined by a predetermined category of data, and generating the second plurality of tags based on the clustering of the plurality of computer files into the one or more subsets of computer files, wherein generating the second plurality of tags includes generating at least one textual datum tag that indicates different but synonymous terms or clauses of the textual data in the predetermined category of data included in the at least two different computer files, wherein the second plurality of tags includes one or more second datum tags that each indicates a datum point of the second plurality of datum points of at least one computer file of the plurality of computer files and one or more second relationship tags that each indicates a spatial relationship between data the second plurality of datum points of the at least one computer file of the plurality of computer files, wherein each of the plurality of computer files corresponds to a textual document, and wherein the one or more second datum tags includes the at least one textual datum tag;

tag each computer file of the plurality of computer files based on the second plurality of tags such that each computer file is associated with at least one of the second datum tags of the second plurality of tags and at least one of the second relationship tags of the second plurality of tags, wherein the at least two different computer files are tagged with the at least one textual datum tag;

search the plurality of computer files for the at least one textual datum tag of the second plurality of tags; and retrieve, in response to the searching, a subset of the plurality of computer files that contain the at least one datum tag of the second plurality of tags.

10. The computing device of claim 9, wherein the instructions, when executed, cause the at least one processor to determine, prior to determining the second plurality of tags, a noise threshold based on the at least one training document, wherein the second plurality of datum points included in the computer file of the plurality of computer files exceed the noise threshold.

11. The computing device of claim 9, wherein generating each second relationship tag of the one or more second relationship tags includes identifying a data relationship that is both shared by more than a threshold number of computer files of the plurality of computer files and shared by less than a threshold percentage of computer files of the plurality of computer files, and generating the respective second relationship tag that indicates the data relationship.

12. The computing device of claim 9, wherein searching the plurality of computer files comprises searching the plurality of computer files for a selected one of the second relationship tags, and wherein retrieving the subset of the plurality of computer files comprises retrieving the subset of files that are all tagged with the selected second relationship tag, the memory further storing instructions for creating a template that, when executed, cause the at least one processor to:

compare a set of data included in the subset of files that are all tagged with the selected second relationship tag;

identify a subset of the data included in the subset of files that is shared by a threshold percentage of the subset of files; and generate an editable computer file template that includes the subset of the data included in the subset of files.

13. A non-transitory computer-readable medium comprising instructions, that when executed, cause one or more processors of a computing device to:

receive at least one training document that includes a first plurality of tags, wherein the at least one training document corresponds to a document type, and wherein the first plurality of tags includes one or more first datum tags that each indicates a datum point of a first plurality of datum points of the at least one training document and one or more first relationship tags that each indicates a spatial relationship between the first plurality of datum points of the at least one training document;

determine, for a plurality of computer files that include data stored in one or more unsearchable formats, a second plurality of tags by:

applying natural language processing to identify a second plurality of datum points included in each computer file of the plurality of computer files, wherein the natural language processing is applied to at least two different computer files of the plurality of computer files, clustering the plurality of computer files and the at least one training document into one or more subsets of computer files having similar spatial relationships between the second plurality of datum points within the respective computer file of the plurality of computer files, wherein the at least two different computer files are clustered into a same subset of the one or more subsets of computer files, and wherein the same subset of the one or more subsets of computer files includes textual data defined by a predetermined category of data, and generating the second plurality of tags based on the clustering of the plurality of computer files into the one or more subsets of computer files, wherein generating the second plurality of tags includes generating at least one textual datum tag that indicates different but synonymous terms or clauses of the textual data in the predetermined category of data included in the at least two different computer files, wherein the second plurality of tags includes one or more second datum tags that each indicates a datum point of the second plurality of datum points of at least one computer file of the plurality of computer files and one or more second relationship tags that each indicates a spatial relationship between data the second plurality of datum points of the at least one computer file of the plurality of computer files, wherein each of the plurality of computer files corresponds to a textual document, and wherein the one or more second datum tags includes the at least one textual datum tag;

tag each computer file of the plurality of computer files based on the second plurality of tags such that each computer file is associated with at least one of the second datum tags of the second plurality of tags and at least one of the second relationship tags of the second plurality of tags, wherein the at least two different computer files are tagged with the at least one textual datum tag;

search the plurality of computer files for the at least one textual datum tag of the second plurality of tags; and retrieve, in response to the searching, a subset of the plurality of computer files that contain the at least one textual datum tag of the second plurality of tags.

14. The non-transitory computer-readable storage medium of claim 13, wherein the instructions, when executed, cause the one or more processors to determine, prior to determining the second plurality of tags, a noise threshold based on the at least one training document, wherein the second plurality of datum points included in the computer file of the plurality of computer files exceed the noise threshold.

15. The non-transitory computer-readable storage medium of claim 13, wherein generating each second relationship tag of the one or more second second relationship tags includes identifying a data relationship that is both shared by more than a threshold number of computer files of the plurality of computer files and shared by less than a threshold percentage of computer files of the plurality of computer files, and generating the respective second relationship tag that indicates the data relationship.

16. The non-transitory computer-readable storage medium of claim 13, wherein searching the plurality of computer files further comprises searching the plurality of computer files for a selected one of the second relationship tags, and wherein retrieving the subset of the plurality of computer files comprises retrieving the subset of files that are all tagged with the selected second relationship tag, further comprising instruction for creating a template that, when executed, cause the processor to:

compare a set of data included in the subset of files that are all tagged with the selected second relationship tag;

identify a subset of the data included in the subset of files that is shared by a threshold percentage of the subset of files; and generate an editable computer file template that includes the subset of the data included in the subset of files.

\* \* \* \* \*